US006285937B1

United States Patent
Buckley

(10) Patent No.: US 6,285,937 B1
(45) Date of Patent: Sep. 4, 2001

(54) SEATBELT DRIVE INTERLOCK SYSTEM

(75) Inventor: Stephen J Buckley, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/483,208

(22) Filed: Jan. 14, 2000

Related U.S. Application Data

(63) Continuation-in-part of application No. 08/980,641, filed on Dec. 1, 1997, now Pat. No. 6,032,089, which is a continuation-in-part of application No. 09/221,504, filed on Dec. 28, 1998.

(51) Int. Cl.[7] .................................................. B60R 21/32
(52) U.S. Cl. ............................................. 701/45; 280/735
(58) Field of Search .................................. 701/45, 1, 36; 280/735; 180/272, 273

(56) References Cited

U.S. PATENT DOCUMENTS 5,684,701 * 11/1997 Breed .................................... 280/735
5,848,802 * 12/1998 Breed et al. .......................... 280/735
5,901,978 * 5/1999 Breed et al. ............................ 701/45
5,943,295 * 8/1999 Varga et al. .......................... 280/735

FOREIGN PATENT DOCUMENTS

004134902 * 6/1992 (DE) .................................... 280/735

OTHER PUBLICATIONS

S. J. Buckley et al., *The Car as a Peripheral, Adapting A Portable Computer To A Vehicle Intranet,* 6 pages, Copyright 1997 Society of Automotivke Engineers, Inc.

* cited by examiner

*Primary Examiner*—Richard M. Camby
(74) *Attorney, Agent, or Firm*—Mark P. Calcaterra

(57) ABSTRACT

A seatbelt drive interlock system for adjusting airbag deployment power based on occupant presence and seatbelt usage enables communication between a plug-and-play stand-alone computer and numerous vehicular electrical systems. Airbag power deployment mode is determined by seatbelt compliance. In addition, seatbelt compliance determines whether the vehicle may enter a drive (forward) position.

3 Claims, 1 Drawing Sheet

SEATBELT DRIVE INTERLOCK SYSTEM

RELATED APPLICATION

This is a continuation-in-part of U.S. application Ser. No. 08/980,641, filed Dec. 1, 1997 now U.S. Pat. No. 6,032,089, and a continuation-in-part of Ser. No. 09/221,504 filed Dec. 28, 1998 pending.

The disclosures of Ser. Nos. 08/980,641 and 09/221,504 are hereby incorporated by reference.

BACKGROUND OF THE INVENTION

Field of the Invention

The invention relates generally to computer interfacing and message exchange among vehicular communication nodes. More specifically, the invention pertains to a seatbelt drive interlock system for adjusting air bag deployment power based on occupant presence and seatbelt usage. Communication is afforded between a removable stand-alone computer, a built-in vehicular display, numerous in-vehicle electrical systems such as air bag controls, seatbelt controls, engine/transmission controls, and vehicle transmission gear position selection controls. Ser. No. 08/980,641 specifically pertains to a communication system including a miniaturized palm top computer which is coupled to a programmable node positioned in an instrument panel of a vehicle. Additionally, Ser. No. 09/221,504 pertains to a communication system including a stand-alone computer coupled to an interface for a computer system of a vehicle. The invention as detailed in the above-referenced parent applications are directly interfaced with the present invention forming a cohesive operative network of linked vehicular electrical systems.

Automotive manufacturers and computer companies have discussed the feasibility of in-vehicle computers. However, these concepts have centered about a permanently installed computer in the vehicle. With the rapid evolution of computer technology, however, a permanently installed computer of a given type would quickly become obsolete as advancements in the computer arts surge onward. Therefore, there is a need for a cost effective approach to link rapidly evolving stand-alone computers to vehicular communication systems such as the present invention.

SUMMARY OF THE INVENTION

Accordingly, this invention describes a seatbelt drive interlock system for adjusting air bag deployment power based on occupant presence and seatbelt usage. The system includes communication among a plug-and-play stand-alone computer and numerous vehicular electrical systems, such as supplementary restraint systems (airbags), gear selection, engine/transmission control, passenger/occupant detection systems, and vehicular status system displays. Information is operatively exchanged through a communication bus which provides communication between the stand-alone computer and the various vehicular electrical systems. The removable computer is placed in a predetermined location in the vehicle to enable communication with an interface to a built-in computer system of the vehicle. The removable computer is video linked to a driver information display mounted in the instrument panel of the vehicle.

Two different states of airbag power are exhibited. The first state, full power, is used if the occupants of the vehicle do not use their seatbelts. The second state, reduced power, is used if the vehicle occupants do use their seatbelts. A full power mode is required to protect the occupants if seatbelts are not used. If the occupants of the vehicle use their seatbelts, less airbag power is required to meet Federal Safety Guidelines. The seatbelts themselves help restrain the occupants, and the airbags, which are considered as supplementary restraint systems, provide an extra level of protection.

The system requires the occupants to fasten their seatbelts before the vehicle may enter a drive (forward) position. The vehicle is locked out of drive (forward) via a mechanical interlock device associated with a vehicle's gear selector. Other secondary vehicle electrical systems may be inhibited if seatbelts are not used. A communication bus provides communication among the drive interlock device and a vehicle's engine/transmission controller. Vehicle gear positions may be locked out via software commands from an interlock module to the engine/transmission controller. The vehicle is locked out of drive (forward) via a mechanical interlock associated with a shifter mechanism via a communication bus to a transmission controller.

Seatbelt compliance is determined by monitoring seatbelt switches in both the driver and passenger seatbelt take-up reels. For example, if no passenger is present, that seatbelt will not require a switch to be set before the vehicle enters drive. It is assumed that the driver's seatbelt compliance is always required. Once the seatbelt switches are set, the vehicle may enter the drive position. If the driver attempts to put the vehicle into drive without the seatbelts fastened, an interlock device will not allow the drive (forward) position.

BRIEF DESCRIPTION OF THE DRAWINGS

The objects and features of the invention will become apparent from a reading of the detailed descriptions, taken in conjunction with the drawings in which.

DETAILED DESCRIPTION

Figure 1:
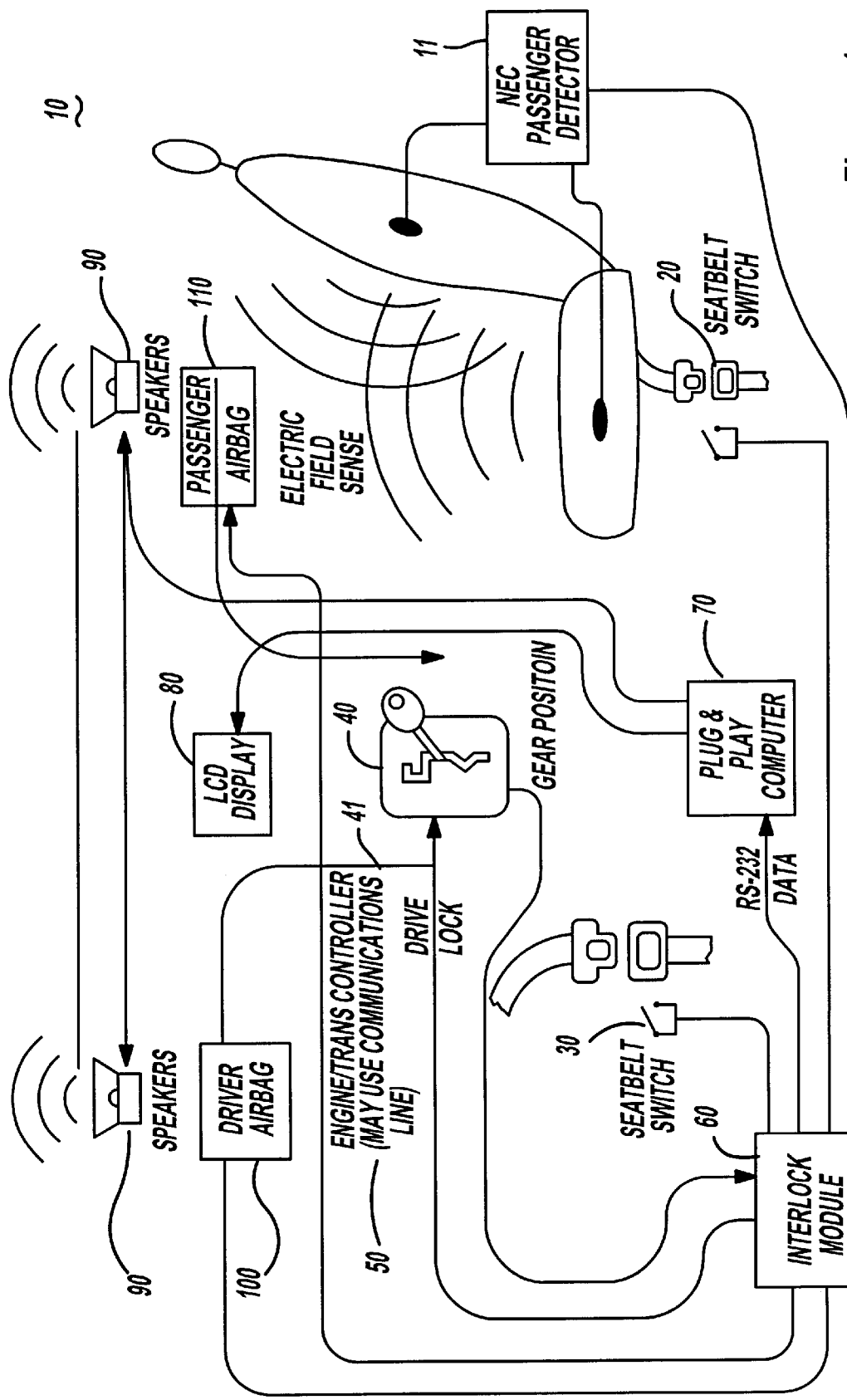
FIG. 1 is a block diagram of a seatbelt drive interlock system arranged in accordance with the principles of the invention.

A vehicle arranged with the contemplated invention includes a sophisticated digital network to link both vehicle and external information sources. In the embodiment of FIG. 1, the seatbelt drive interlock system 10 requires the occupants to fasten their seatbelts before the vehicle may enter the drive (forward) position. A passenger/occupant detection system 11 monitors the presence of an occupant. If no passenger is present, determined by the passenger/occupant detection system 11, that seatbelt switch 20 is not required to be set before the vehicle enters drive.

A commercially available embodiment of the passenger/occupant detection system 11 is the NEC Passenger Sensing System. In the NEC system, flexible antennae are located under fabric and in front seat cushions of the vehicle. Electric field lines are produced which can be sensed and transmitted by an electronic control module in the system. The electronic module determines a vehicle's seatbelt compliance (usage) and communicates with numerous vehicular electrical systems such as a transmission controller, an engine controller, and a stand-alone computer, for proper airbag deployment power level.

The driver's seatbelt switch 30 is always required to be set. If both the passenger seatbelt switch 20 and the driver's seatbelt switch 30 are set, then the vehicle may enter a drive position via a gear selector interlock device 40.

Communication is provided between the passenger seatbelt switch 20 and driver's seatbelt switch 30 and the seat selector interlock device 40 via a communication bus 41. This drive interlock feature may also be controlled via the communication bus 41 leading to an engine/transmission controller 50.

Gear positions may then be locked out via software commands from an interlock module 60 to the engine/transmission controller 50. The interlock module 60 monitors the output from the passenger/occupant detection system 11, the passenger seatbelt switch 20, the driver's seatbelt switch 30, and vehicle drive gear position. The module 60 also determines seatbelt compliance and transmits the compliance data to the engine/transmission controller 50 with the aid of a plug-and-play stand-alone computer 70. The interlock system 60 also determines which airbag power level is used based on seatbelt compliance and occupant presence.

The plug-and-play stand-alone computer 70 is used to generate a graphic display 80 and an audible warning message 90 to the driver indicating which airbag power level is currently in use.

Both a driver airbag module 100 and a passenger airbag module 110 are capable of multiple power levels to engage the airbags for both the driver and passenger. The plug-and-play stand-alone computer 70 generates an audible and graphical message indicating that seatbelt compliance has been identified and the airbag modules 100 and 110 are placed in a lower power mode. If the driver attempts to put the vehicle into drive without the seatbelts fastened, it will not engage the gear. An audible message will also be used to tell the driver why the drive position is not working.

At anytime the vehicle may be started and moved using a reverse gear and neutral (regardless of seatbelt usage). Only forward motion of the vehicle is delayed until the seatbelts are fastened. If the vehicle occupants unbuckle their seatbelts at any time after the vehicle has been put into drive or while the vehicle is moving, an audible and graphic message will be used to warn them that the airbag modules 100 and 110 have been placed into full power mode. The vehicle will not stop, but there has been a mode change in airbag deployment. The driver may continue to drive the vehicle with the seatbelts unfastened, but with knowledge that the airbags are now in a full power mode.

If the seatbelts are unfastened while the vehicle is in drive, the vehicle will not be disabled from moving forward. As previously stated, both visual and audible alarms will be initiated and airbag power mode will be changed to full power.

The invention has been described with reference to an exemplary embodiment. This description is for the sake of example only, and the scope and spirit of the invention are to be construed by appropriate interpretation of the appended claims.

What is claimed is:

1. A seatbelt drive interlock system for adjusting airbag deployment power based on occupant presence and seatbelt usage by communication with an in-vehicle stand-alone computer system comprising:

a passenger/occupant detection system;

a communications medium coupling the passenger/occupant detection system to the stand-alone computer system for adjusting airbag deployment power.

2. The seatbelt drive interlock system of claim 1 wherein the passenger/occupant detection system comprises a NEC Automotive Electronics Passenger Sensing System.

3. The seatbelt drive interlock system of claim 1 wherein the standalone computer is a laptop model.

* * * * *